United States Patent [19]
Nishida et al.

[11] Patent Number: 6,092,379
[45] Date of Patent: Jul. 25, 2000

[54] SUPERCRITICAL REFRIGERATING CIRCUIT

[75] Inventors: Shin Nishida, Anjo; Naruhide Kimura; Yukikatsu Ozaki, both of Nishio, all of Japan

[73] Assignee: DENSO Corporation, Kariya, Japan

[21] Appl. No.: 09/352,676

[22] Filed: Jul. 14, 1999

[30] Foreign Application Priority Data

Jul. 15, 1998 [JP] Japan .................................. 10-200693

[51] Int. Cl.⁷ ...................................................... F25B 5/02
[52] U.S. Cl. .............................. 62/200; 62/210; 62/222; 62/114
[58] Field of Search .............................. 62/199, 200, 203, 62/204, 208, 209, 210, 222, 224, 225, 212, 114, 174, 502

[56] References Cited

U.S. PATENT DOCUMENTS

| | | | |
|---|---|---|---|
| 4,389,855 | 6/1983 | Ueda et al. | 62/200 |
| 4,565,072 | 1/1986 | Fujiwara et al. | 62/200 X |
| 5,245,836 | 9/1993 | Lorentzen et al. | 62/174 |
| 5,685,160 | 11/1997 | Abersfelder et al. | 62/114 |

FOREIGN PATENT DOCUMENTS 10-115470  5/1998  Japan .

*Primary Examiner*—Harry B. Tanner
*Attorney, Agent, or Firm*—Harness, Dickey & Pierce, PLC

[57] ABSTRACT

The supercritical refrigerating circuit has a first pressure reducing valve for reducing pressure of refrigerant flows into a first evaporator and a second pressure reducing valve for reducing pressure of refrigerant flows into a second evaporator. The first pressure reducing valve further controls refrigerant pressure at an outlet of a gas cooler. Accordingly, the supercritical refrigerant circuit is controlled without increasing the number of the pressure reducing valve.

8 Claims, 11 Drawing Sheets

RADIATOR OUTLET PRESSURE (MPa)

SUPERCRITICAL REFRIGERATING CIRCUIT

CROSS REFERENCE TO RELATED APPLICATION

This application is based upon and claims priority from Japanese patent application No. Hei 10-200693, filed Jul. 15, 1998, the entire contents of which are incorporated herein by reference.

BACKGROUND OF THE INVENTION

1. Field of the Invention

The present invention relates to a vapor compression refrigerating apparatus (supercritical refrigerating cycle) in which a pressure inside a radiator (high pressure side) exceeds a critical pressure of a refrigerant. Preferably, the present invention is applicable to an automotive air conditioner.

2. Description of Related Art

One type of known supercritical refrigerating apparatus is disclosed in JP-A-10-115470 (U.S. patent application Ser. No. 08/916634).

Such conventional apparatus has a first pressure control valve, which reduces the pressure of the refrigerant flowed from a radiator, for controlling pressure at a radiator outlet according to a refrigerant temperature at the radiator outlet, and has a receiver for storing the refrigerant flowed from the first pressure control valve by separating liquid refrigerant and gaseous refrigerant. It also has a second pressure control valve, which reduces the pressure of the refrigerant flowed from the receiver, for controlling refrigerant flow rate such that the superheating of the refrigerant at a compressor inlet is kept constant.

According to the conventional apparatus, however, the supercritical refrigerating cycle is controlled by using two pressure control valves for one evaporator. Thus, when the conventional apparatus is simply applied to a supercritical refrigerating cycle having two evaporators, it is necessary to have a pressure control valve for controlling the refrigerant pressure at the radiator outlet, and two pressure control valves for controlling the superheating of the refrigerant at respective evaporator outlets. In other words, the number of the valve increases as the number of the evaporator increases.

SUMMARY OF THE INVENTION

The present invention is made in light of the foregoing problem, and it is an object of the present invention to provide a supercritical refrigerating circuit which reduces the number of the valve.

According to the supercritical refrigerating circuit of the present invention, the supercritical refrigerating circuit has a first pressure reducing member for reducing pressure of refrigerant flows into a first evaporator and a second pressure reducing member for reducing pressure of refrigerant flows into a second evaporator. The first pressure reducing member further controls refrigerant pressure at an outlet of a gas cooler such that the refrigerant pressure at the outlet becomes a certain pressure determined by refrigerant temperature at the outlet of the gas cooler.

Accordingly, the supercritical refrigerant circuit is controlled without increasing the number of the pressure reducing member.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Embodiments of the present invention will be described hereinafter with reference to the drawings.

(First embodiment)

A first embodiment of the present invention is a supercritical refrigerating cycle applied to an air conditioning apparatus for a vehicle.

Figure 1:
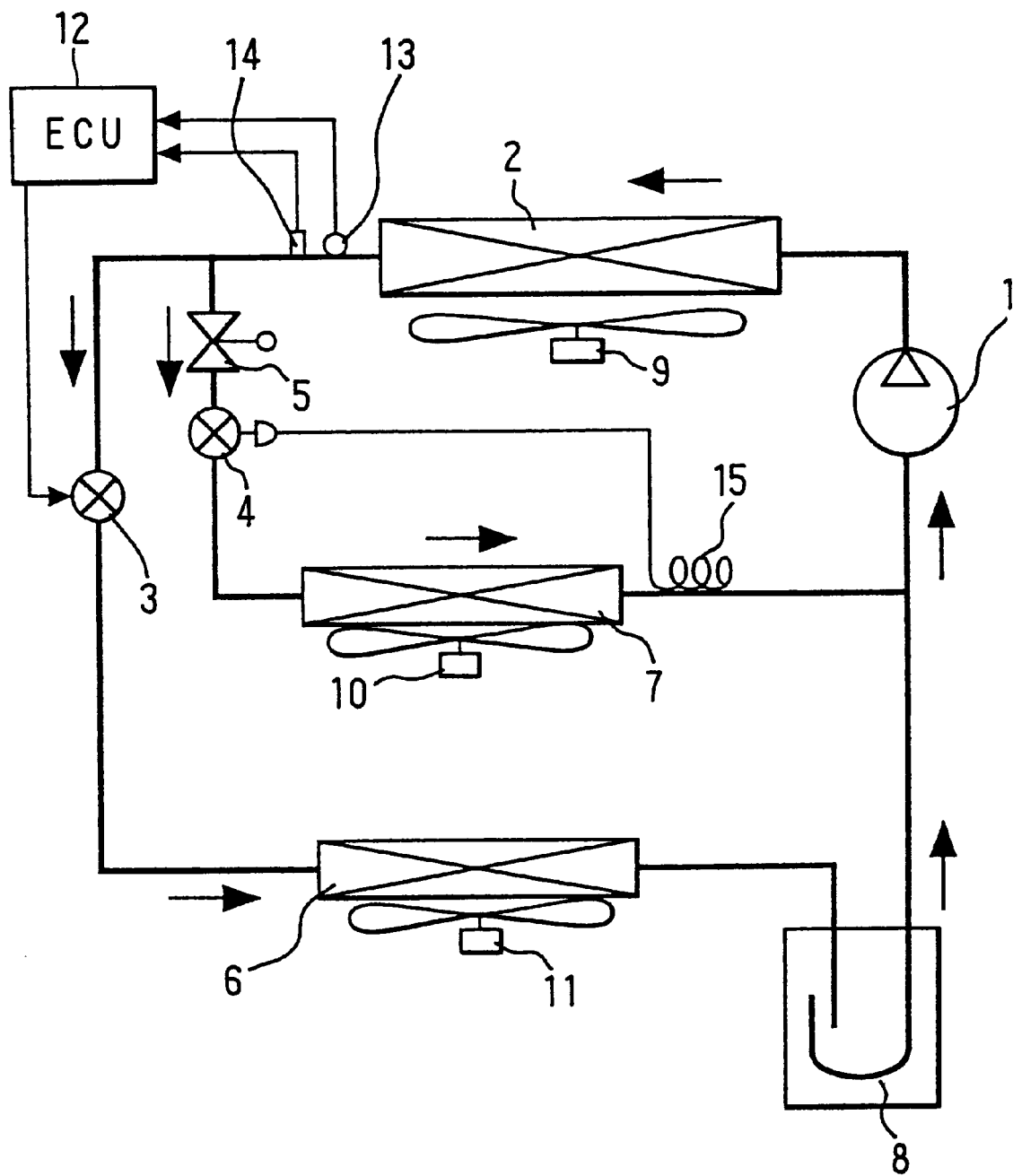
FIG. 1 is a schematic illustration showing a $CO_2$ cycle according to a first embodiment of the present invention.

In FIG. 1, a compressor 1 is driven to suck and compress refrigerant $CO_2$. A gas cooler 2, which functions as a radiator, cools $CO_2$ compressed and discharged from the compressor 1. The internal pressure of the gas cooler 2 exceeds the critical pressure of $CO_2$. In this specification, a supercritical refrigerating cycle, using $CO_2$ as a refrigerant, is called $CO_2$ cycle.

A first pressure reducing valve 3 and a second pressure reducing valve 4 reduce the pressure of refrigerant (high-pressure-refrigerant) flowed from the gas cooler 2.

A first evaporator 6 evaporates low-pressure-refrigerant flowed from the first pressure reducing valve 3. A second evaporator 7 evaporates low-pressure-refrigerant flowed from the second pressure reducing valve 4. The first evaporator 6 cools air to be blown toward a front cabin, and the second evaporator 7 cools air to be blown toward a rear cabin.

The first pressure reducing valve 3 is electrically controlled by an electronic control unit (ECU) 12. A temperature sensor 13 detects refrigerant temperature at the outlet of the gas cooler 2. A pressure sensor 14 detects refrigerant pressure at the outlet of the gas cooler 2. These detected temperature and pressure are inputted to ECU 12.

Figure 2:
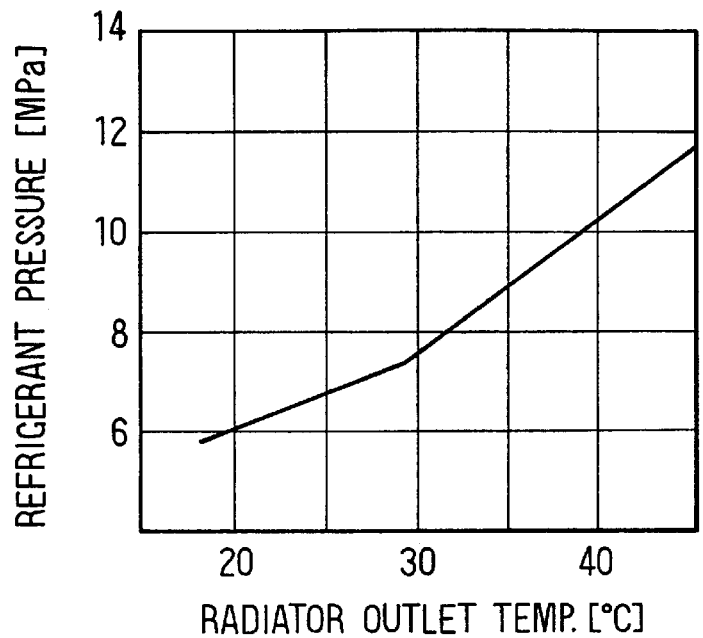
FIG. 2 is a graph showing a relation between refrigerant pressure and refrigerant temperature at a radiator outlet according to the first embodiment of the present invention.

ECU 12 controls an opening degree of the first pressure reducing valve 3 such that the detected refrigerant pressure at the outlet of the gas cooler 2 becomes a certain pressure which is determined based on the detected refrigerant temperature at the outlet of the gas cooler 2 as shown in FIG. 2. Specifically, the refrigerant pressure at the outlet of the gas cooler 2 is increased by reducing the opening degree of the first pressure reducing valve 3 as the detected temperature increases, and is decreased by increasing the opening degree of the first pressure reducing valve 3 as the detected temperature decreases.

Figure 3:
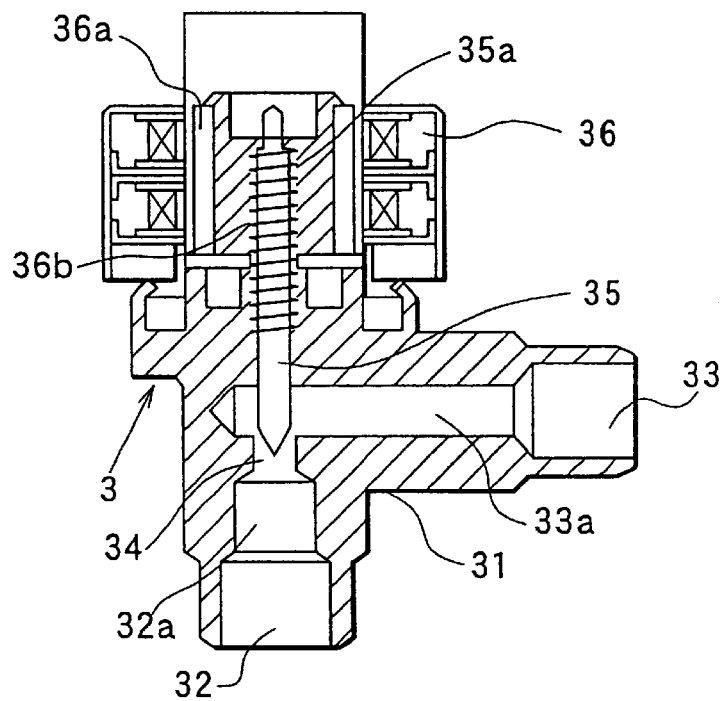
FIG. 3 is a schematic illustration showing a first pressure control valve according to the first embodiment of the present invention.

As shown in FIG. 3, housing 31 of the first pressure reducing valve 3 has an inlet port 32 connected to the outlet of the gas cooler 2 and an outlet port 33 connected to an inlet of the first evaporator 6. A valve opening 34, for communicating space 32a of the inlet port 32 with space 33a of the outlet port 33, is formed in the housing 31. The housing 31 also has a valve body 35 to change the opening degree of the valve opening 34.

A step motor 36 controls the opening degree of the valve opening 34, that is the opening degree of the first pressure reducing valve 3, by shifting the valve body 35. Female screw 36b is formed on a magnet rotor 36a of the step motor 36. Male screw 35a which engages with the female screw 36b is formed on the valve body 35.

ECU 12 linearly controls the opening degree of the valve opening 34 from fully closed state to fully opened state by rotating the step motor 36 and shifting the valve body 35 in an axial direction of the valve body 35.

Pressure bulb 15 changes its internal pressure according to the refrigerant temperature at the outlet of the second evaporator 7. The second pressure reducing valve 4 is the so-called thermal expansion valve to control its opening degree by the pressure bulb 15 such that the superheating of the refrigerant at the outlet of the second evaporator 7 becomes a certain value.

An accumulator (gas-liquid separator) 8 separates gas-liquid two-phase $CO_2$ into gas phase $CO_2$ and liquid phase $CO_2$, and temporarily accumulates liquid phase $CO_2$ therein. Separated gas phase $CO_2$ is discharged from the accumulator 8 to a suction side of the compressor 1.

The liquid phase refrigerant is prevented from being sucked into the compressor 1 by the accumulator 8 and the second pressure reducing valve 4 for the refrigerant flowed from the first evaporator 6 and the second evaporator 7 respectively.

An electromagnetic valve 5 is controlled by ECU 12 to switch between allowing and forbidding the flow, into the second pressure reducing valve 4 or the second evaporator 7, of the refrigerant flowed out from the gas cooler 2.

Blowers 9, 10 and 11 are controlled by ECU 12 to blow air to the gas cooler 2 and the evaporators 6 and 7 respectively.

The outline of the operation of the supercritical refrigerating cycle according to the first embodiment will now be described.

The operation of the $CO_2$ cycle is theoretically the same as the one of a conventional vapor compression refrigerating cycle using flon.

Figure 4:
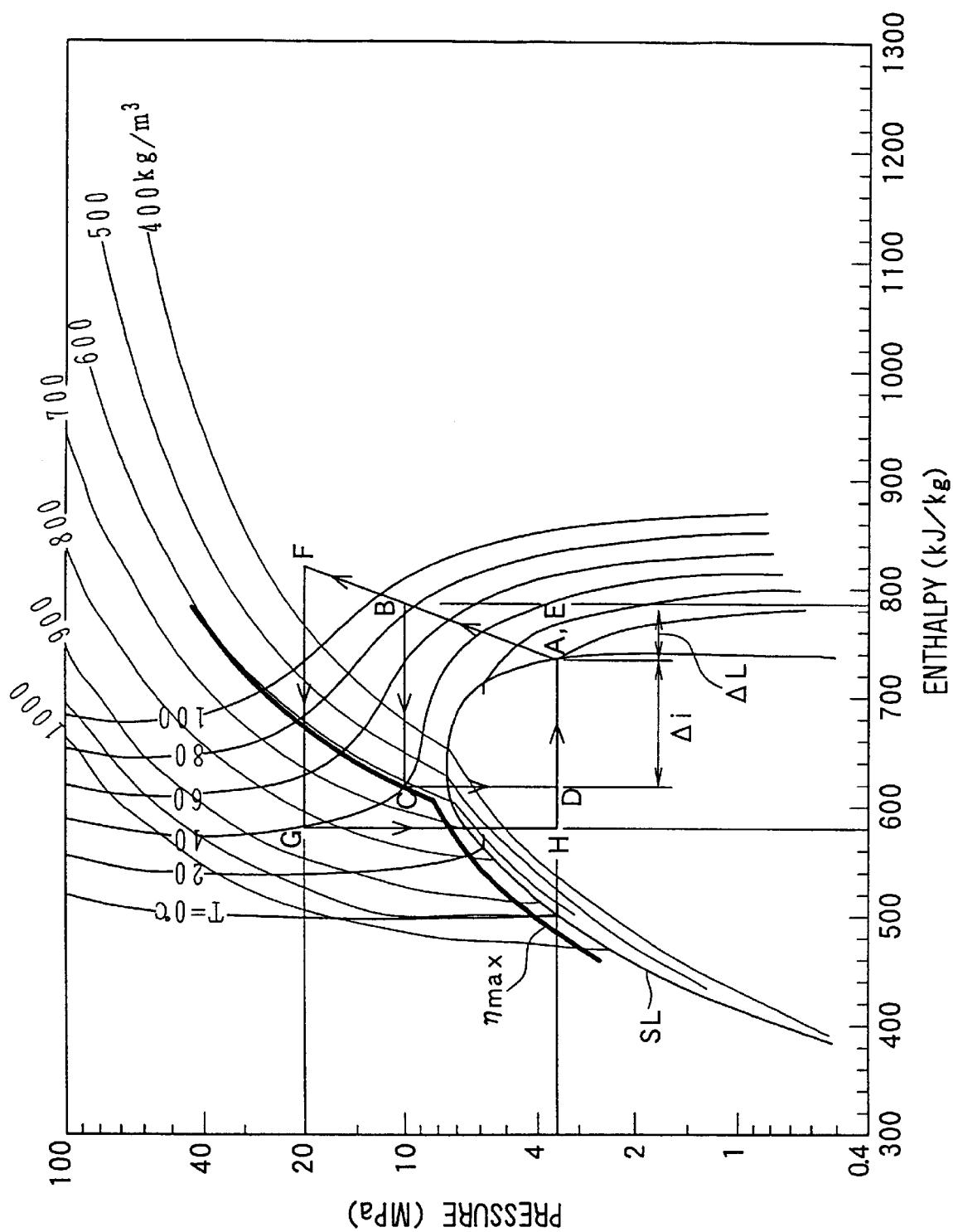
FIG. 4 is a Mollier diagram of $CO_2$ according to the first embodiment of the present invention.

Specifically, as shown by arrows A-B-C-D-A in FIG. 4, the gas phase $Co_2$ is compressed (A-B), and the compressed $CO_2$ with supercritical condition is cooled (B-C). $CO_2$ with high temperature and high pressure is decompressed (C-D), and the gas-liquid two-phase $CO_2$ is evaporated in the evaporator (D-A) to cool air to be blown to the cabin.

It is to be noted that $Co_2$ starts its phase transition into the gas-liquid two-phase when its pressure is less than the saturated liquid pressure, that is a pressure at the intersection between the line C-D and the saturated liquid curve SL. Specifically, when $CO_2$ slowly changes its phase from C state to D state, $CO_2$ changes its phase from the supercritical condition to the gas-liquid two-phase via the liquid phase.

In this specification, the supercritical condition means a state in which the refrigerant molecules behave as if they were in the gas phase though its density is substantially the same as the liquid density.

The critical temperature of $CO_2$, that is about 31° C., is lower than that of the conventional flon (for example, the critical temperature of R12 is 112° C.). Accordingly, the refrigerant temperature at the gas cooler 2 may exceed the refrigerant critical temperature in summer. In other words, $CO_2$ is not condensed at the outlet of the gas cooler 2, that is to say, the line B-C does not cross the saturated liquid curve.

The state at the outlet of the gas cooler 2 (at the point C) is determined by the discharging pressure of the compressor 1 and the refrigerant temperature at the outlet of the gas cooler 2. The refrigerant temperature at the outlet of the gas cooler 2 is determined by the atmospheric temperature and the radiation performance of the gas cooler 2. Since the atmospheric temperature is not controllable, the refrigerant temperature at the outlet of the gas cooler 2 is substantially uncontrollable.

Thus, the state at the outlet of the gas cooler 2 (at the point C) is controllable by controlling the discharging pressure of the compressor 1, that is the outlet pressure of the gas cooler 2. In other words, in order to maintain sufficient refrigeration performance (that is, enthalpy difference) under the high temperature conditions, such as in the summer, it is necessary to increase the pressure at the outlet of the gas cooler 2 as shown by arrows E-F-G-H-E in FIG. 4.

In order to increase the pressure at the outlet of the gas cooler 2, however, the discharging pressure of the compressor 1 has to be increased. Therefore, the work of compression, that is an enthalpy change amount $\Delta L$ in the compression process A-B, increases. Accordingly, coefficient of performance of the $CO_2$ cycle (COP=$\Delta i/\Delta L$) is compromised when an increased amount of $\Delta L$ is greater than that of $\Delta i$, where $\Delta i$ represents an enthalpy change amount in the evaporation process D-A.

Figure 5:
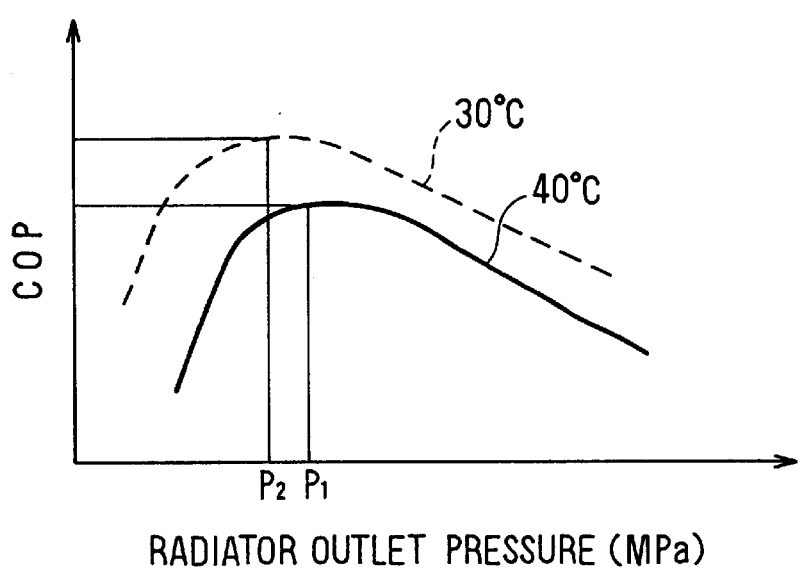
FIG. 5 is a graph showing a relation between coefficient of performance and refrigerant pressure at a radiator outlet according to the first embodiment of the present invention.

According to the relation between the refrigerant pressure at the outlet of the gas cooler 2 and COP calculated under the condition that the refrigerant temperature at the outlet of the gas cooler 2 is 40° C. by using FIG. 4, COP is maximized at pressure P1 (about 10 MPa) as shown by the solid curve in FIG. 5. Similarly, COP is maximized at pressure P2 (about 9.0 MPa) as shown by the dotted curve in FIG. 5 when the refrigerant temperature at the outlet of the gas cooler 2 is 35° C.

According to such calculation to determine the pressure which maximizes COP with reference to the refrigerant temperature at the outlet of the gas cooler 2, the most favorable control line $\eta_{max}$ shown by the bold solid line in FIG. 4 is obtained. Further, the relation between the refrigerant temperature and refrigerant pressure at the outlet of the gas cooler 2 is substantially the same as the one shown in FIG. 2.

Thus, it is necessary to control the refrigerant temperature and refrigerant pressure at the outlet of the gas cooler 2 according to the most favorable control line $\eta_{max}$ order to operate the $CO_2$ cycle efficiently.

In the first embodiment, the $CO_2$ cycle is efficiently controlled because the refrigerant temperature and refrigerant pressure at the outlet of the gas cooler 2 are controlled according to the most favorable control line $\eta_{max}$ shown in FIG. 2 by the first pressure reducing valve 3.

The electromagnetic valve 5 is closed when it is stopped cooling the air to be blown toward the rear cabin.

According to the conventional refrigerant cycle using flon and having plural evaporators, the same number of the pressure reducing valves are necessary for respective evaporators in order to control respective evaporators independently. On the other hand, the conventional refrigerant cycle using $CO_2$ requires two pressure reducing valves to control one evaporator.

According to the first embodiment of the present invention, however, the first pressure reducing valve 3 controls the refrigerant pressure at the outlet of the gas cooler 2 and reduces the pressure of the refrigerant flows into the first evaporator 6, and the second pressure reducing valve 4 reduces the pressure of the refrigerant flows into the second evaporator 7. Thus, the $CO_2$ cycle is controlled by the same number of pressure reducing valves 3 and 4 for respective evaporators 6 and 7.

Accordingly, the $CO_2$ cycle having the evaporators 6 and 7 is efficiently controlled without increasing the number of the pressure reducing valves.

(Second embodiment)

In this and subsequent embodiments, components which are substantially the same to those in the first embodiment are assigned the same reference numerals.

Figure 6:
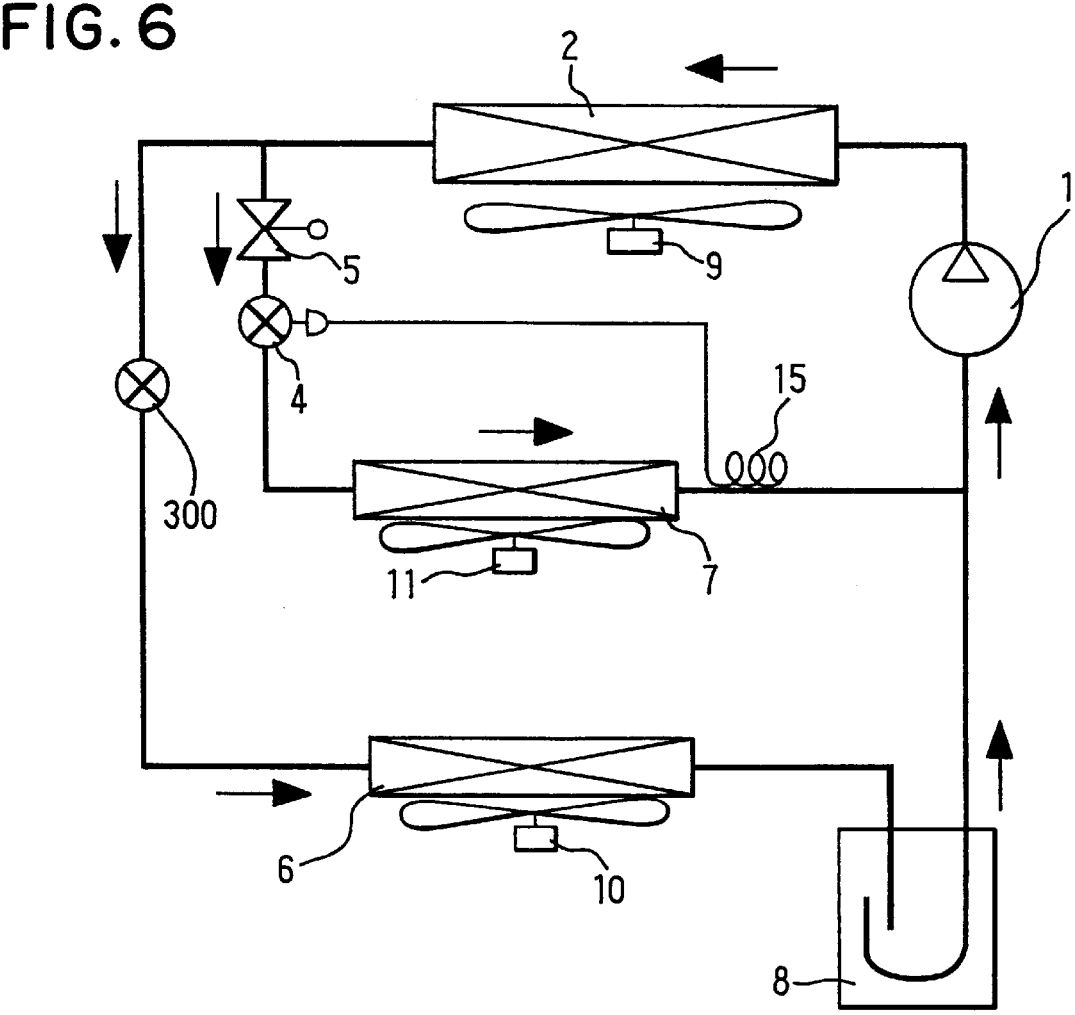
FIG. 6 is a schematic view showing a $CO_2$ cycle according to a second embodiment of the present invention.

As shown in FIG. 6, the first pressure reducing valve 3 in the first embodiment is replaced by a first pressure reducing mechanical valve 300 in the second embodiment to simplify the $CO_2$ cycle. The first pressure reducing valve 300 will now be described with reference to FIGS. 7 to 9.

Figure 7:
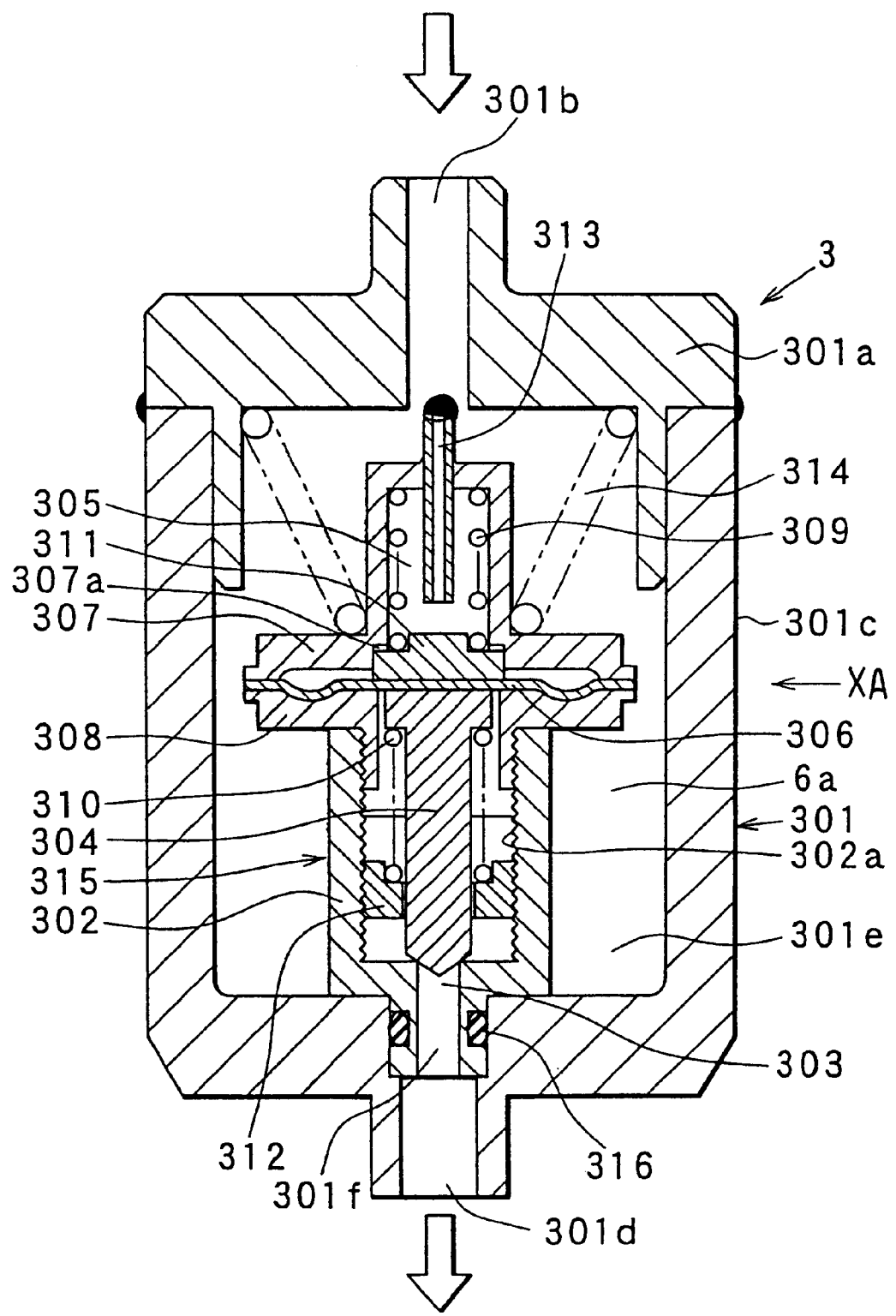
FIG. 7 is a sectional view showing a first pressure control valve according to the second embodiment of the present invention.

As shown in FIG. 7, a casing 301 for housing an element case 315 forms a part of a refrigerant passage from the gas cooler 2 to the first evaporator 6. An upper cover 301a has an inlet port 301b connected to the gas cooler 2. A main portion 301c of the casing 301 has an outlet port 301d connected to the first evaporator 6.

The casing 301 has a partition 302 to divide the refrigerant passage into an upstream space 301e and a downstream space 301f. A valve opening 303 for communicating the upstream space 301e and the downstream space 301f is formed in the partition 302.

The valve opening 303 is opened/closed by a needle-shaped valve body 304. The valve body 304 and a diaphragm 306 have a structure to close the valve opening 303 when the diaphragm 306 is displaced toward the valve body 304 from its neutral position according to the displacement of the diaphragm 306, and to maximize its opening degree of the valve opening 303 when the diaphragm 306 is displaced toward the opposite direction to the valve body 304.

In this specification, the neutral position of the diaphragm 306 means a condition that the displacement stress is substantially zero with no displacement of the diaphragm 306.

Sealed space (sealed gas chamber) 305 is formed in the upstream space 301e. The sealed space 305 has the diaphragm 306 and an upper supporting member 307 which is located on an upper side of the diaphragm 306. The diaphragm 306 is made of thin stainless film which deforms according to the pressure difference between an inside pressure and an outside pressure of the sealed space 305.

On an lower side of the diaphragm 306, a lower supporting member 308 for supporting the diaphragm 306 with the upper supporting member 307 is provided. A deforming portion 306a is formed on the diaphragm 306 to make the deformation of the diaphragm 306 easier.

Figure 8:
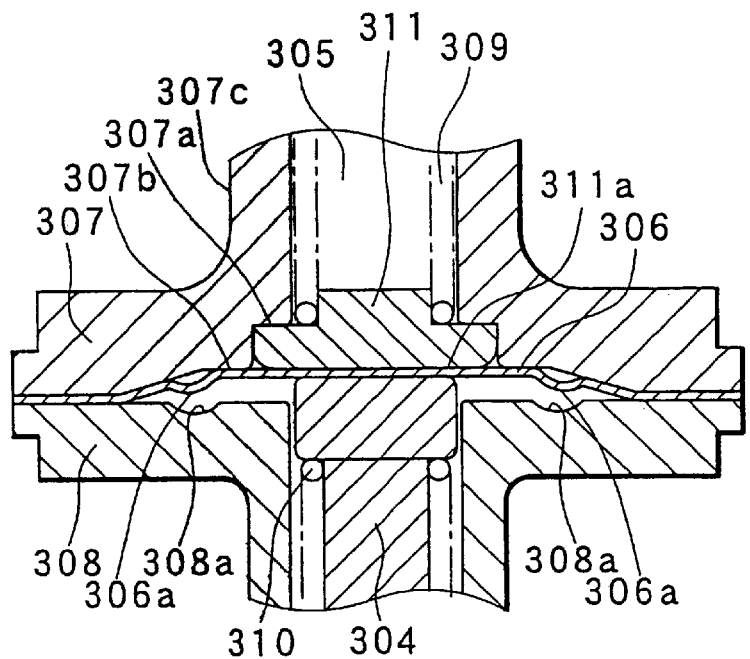
FIG. 8 is an enlarged diaphragm portion of the valve showing a valve opened state according to the second embodiment of the present invention.
Figure 9:
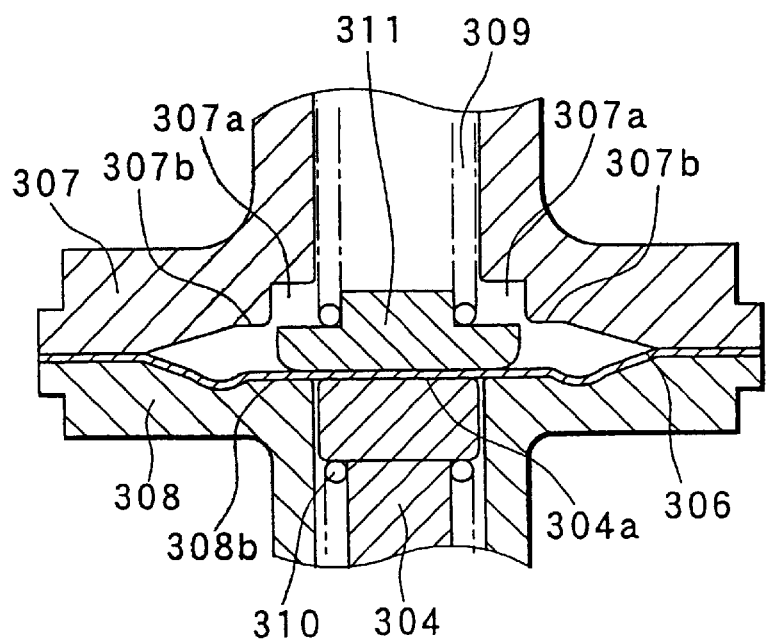
FIG. 9 is an enlarged diaphragm portion of the valve showing a valve closed state according to the second embodiment of the present invention.

As shown in FIGS. 8 and 9, a concave portion 308a, disposed opposite the deforming portion 306a to match it with the deforming portion 306a, is formed on the lower supporting member 308.

The deforming portion 306a is a wave-shaped portion formed on a part of the diaphragm 306 at its radially outer portion to deform the diaphragm 306 in substantially proportion to pressure difference between the inside pressure and the outside pressure of the sealed space 305.

The lower supporting member 308 has a lower side flat portion 308b such that it locates in substantially the same plane of a surface 304a of the valve body 304 contacting the diaphragm 306 under the condition that the valve opening 303 is closed by the valve body 304.

As shown in FIG. 7, a first coil spring 309, for applying a spring force to close the valve opening 303 with the valve body 304 via the diaphragm 306, is installed in the sealed space 305, namely at the upper side of the diaphragm 306. Similarly, a second coil spring 310, for applying a spring force to open the valve opening 303 with the valve body 304, is installed at the lower side of the diaphragm 306.

A metal plate 311, as a spring seat for the first coil spring 309, is a rigid body which has a certain thickness to obtain greater rigidity than the diaphragm 306. As shown in FIGS. 8 and 9, the plate 311 restricts the deformation of the diaphragm 306 into the upper direction (toward the sealed space 305) by contacting a stepped portion (stopper) 307a formed on the upper supporting member 307.

The upper supporting member 307 has an upper side flat portion 307b such that it locates in substantially the same plane of a surface 311a of the plate 311 contacting the diaphragm 306 when the plate 311 makes a contact with the stepped portion 307a.

An inner wall of a cylindrical portion 307c of the upper supporting member 307 also functions as a guide member for guiding the first coil spring 309.

Since the plate 311 and the valve body 304 are pushed to the diaphragm 306 by coil springs 309 and 310 respectively, the plate 311, the valve body 304 and the diaphragm 306 deform (move) together keeping the contact state.

In FIG. 7, an adjusting screw 312 adjusts the spring force of the second coil spring 310 affecting to the valve body 304, and also functions as a plate for the second coil spring 310. The adjusting screw 312 is engaged with a female screw 302a formed on the partition 302.

The initial load of the coil springs 309, and 310, that is an elastic force under the condition that the valve opening 303 is closed, is about 1MPa by pressure conversion at the diaphragm 306.

A filler tube 313 for filling $CO_2$ in the sealed space 305 penetrates the sealed space 305. The filler tube 313 is made of copper or the like which has greater heat conductivity than the upper supporting member 307 made of stainless. The lower supporting member 308 is also made of stainless.

One end of the filler tube 313 is sealed by welding or the like after filling $CO_2$ in the sealed space 305 with a density of about 600 kg/m³.

A conical spring 314 fixes an element case 315 in the main portion 301c of the casing 301. The element case 315 includes the partition 302 to the filler tube 313. O-ring 316 seals a gap between the partition 302 of the element case 315 and the main portion 301c of the casing 301.

Figure 10A:
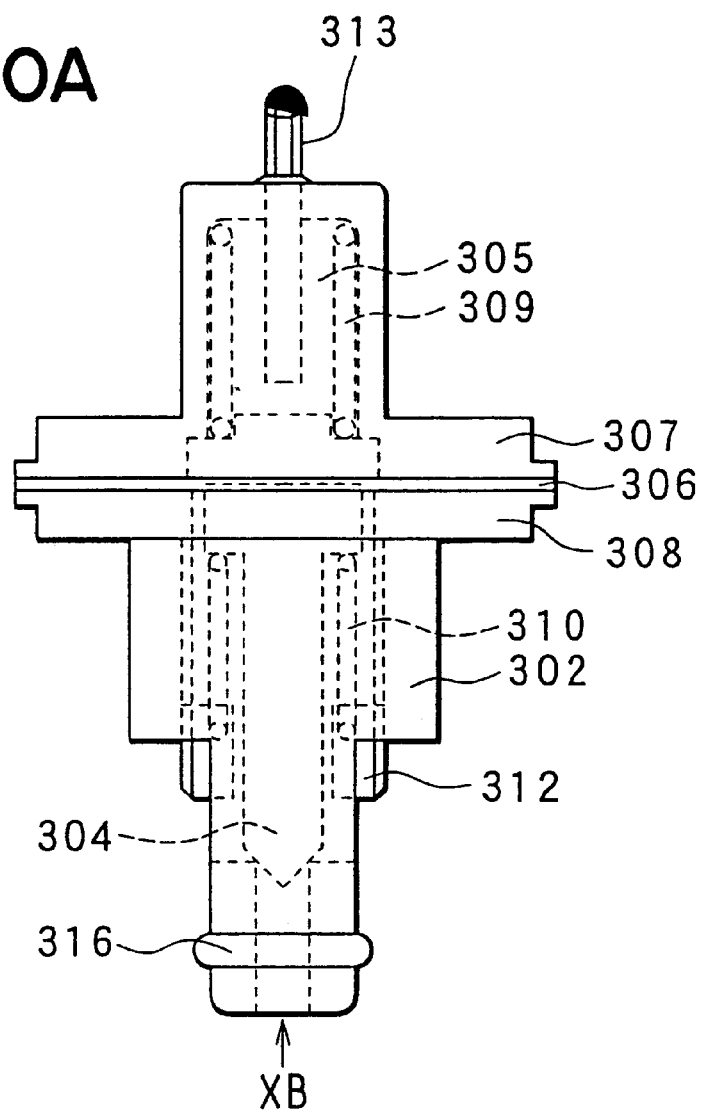
FIG. 10A is a side view viewed from an arrow XA in FIG. 7 according to the second embodiment of the present invention.
Figure 10B:
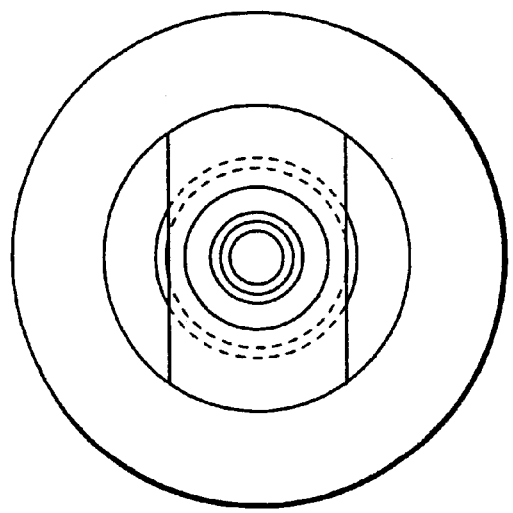
FIG. 10B is a bottom view viewed from an arrow XB in FIG. 10B according to the second embodiment of the present invention.

It is apparent from FIGS. 10A and 10B that the valve opening 303 communicates with the upstream space 301e at a side of the partition 302.

Operations of the first pressure reducing mechanical valve 300 (pressure control valve) in the second embodiment will now be described.

The internal pressure and temperature of the sealed space 305 vary according to the isopycnic line of 600 kg/m$^3$ shown in FIG. 4 because the sealed space 305 is filled with $CO_2$ at 600 kg/m$^3$. Accordingly, for example, the internal pressure of the sealed space 305 is about 5.8 MPa when the internal temperature of the same is 20° C.

Since the internal pressure of the sealed space 305 and the initial load of the coil springs 309, 310 are simultaneously acting upon the valve body 304, the action pressure is about 6.8 MPa.

Thus, the valve opening 303 is closed by the valve body 304 when a pressure at the upstream space 301e, that is the gas cooler side, is equal to or lower than 6.8 MPa. The valve opening 303 is opened when the pressure at the upstream space 301e is greater than 6.8 MPa.

Similarly, for example, the internal pressure of the sealed space 305 is about 9.7 MPa when the internal temperature of the same is 40° C. (see FIG. 4), and the action pressure acing upon the valve body 304 is about 10.7 MPa. Accordingly, the valve opening 303 is closed by the valve body 304 when a pressure at the upstream space 301e is equal to or less than 10.7 MPa. The valve opening 303 is opened when the pressure at the upstream space 301e is greater than 10.7 MPa.

As described above, the refrigerant pressure and the refrigerant temperature at the outlet of the gas cooler 2 are controlled according to the isopycnic line of 600 kg/m$^3$, that is the most favorable control line $\eta_{max}$ shown in FIG. 4.

(Third embodiment)

Figure 11:
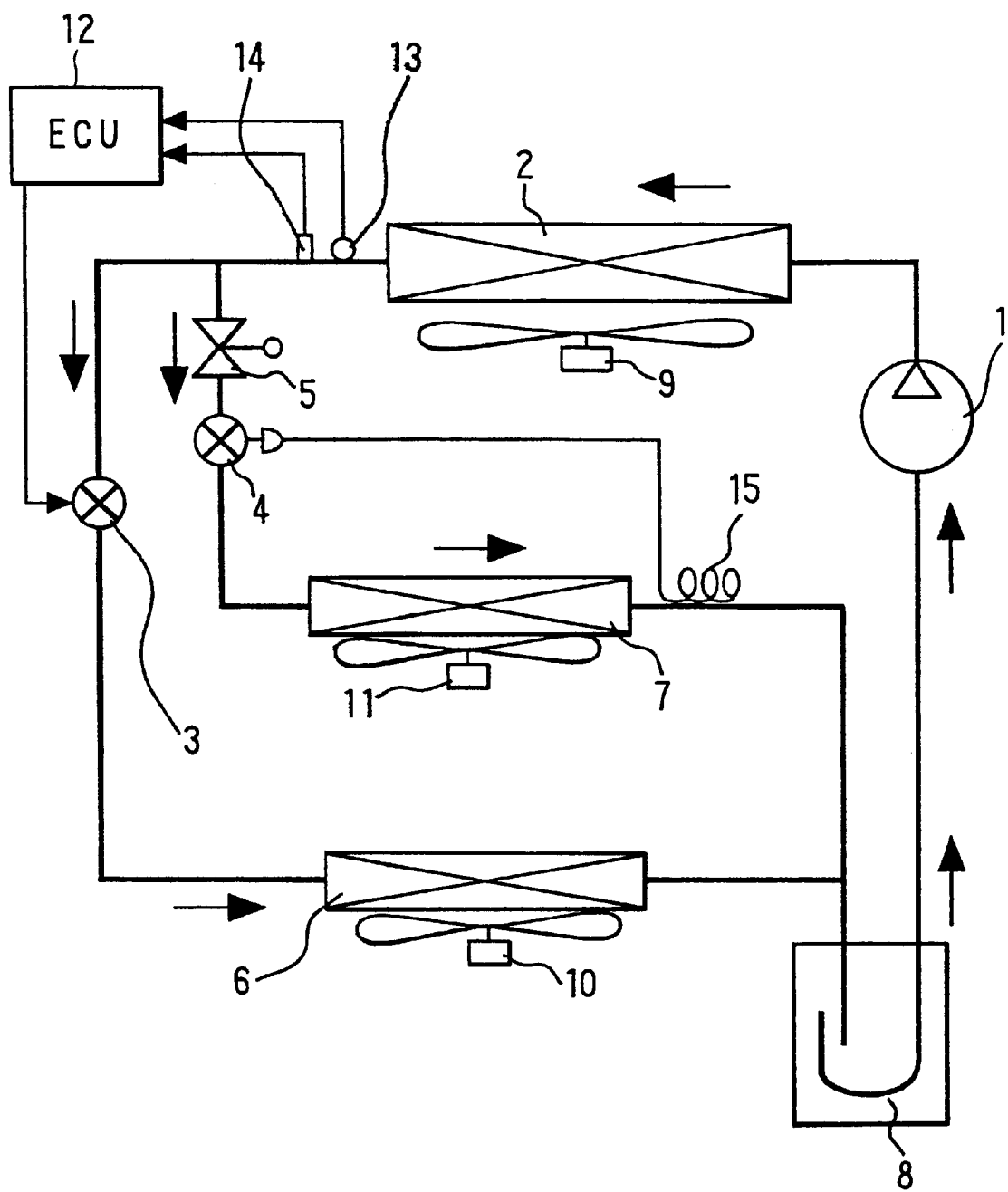
FIG. 11 is a schematic illustration showing a $CO_2$ cycle according to a third embodiment of the present invention.
Figure 12:
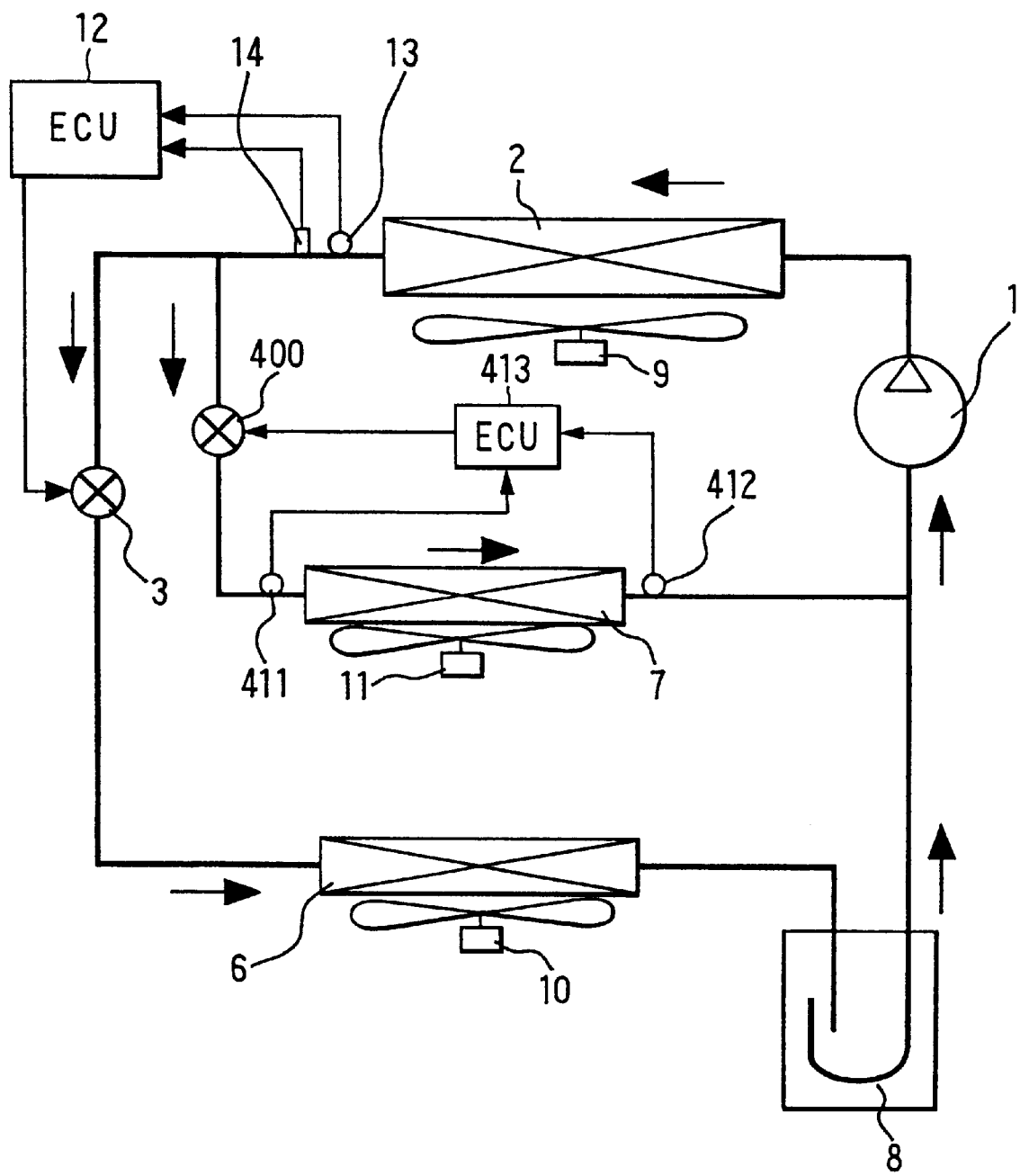
FIG. 12 is a schematic illustration showing a $CO_2$ cycle according to a fourth embodiment of the present invention.

According to a third embodiment of the present invention, the refrigerant flowed out from the second evaporator 7 also flows into the accumulator 8 as shown in FIG. 11.

Accordingly, the liquid phase refrigerant is surely prevented from being sucked into the compressor 1. Therefore, the damage of the compressor 1 is prevented, and the reliability of the $CO_2$ cycle is improved.

(Fourth embodiment)

According to a fourth embodiment of the present invention, the mechanical second pressure reducing valve 4 in the first embodiment is replaced by an electric type second pressure reducing valve 400 which has a similar structure as the first pressure reducing valve 3, and the electromagnetic valve 5 is eliminated.

An electronic control unit 413 determines a degree of the superheating of the refrigerant at the outlet of the second evaporator 7 from a refrigerant temperature difference between temperatures at the inlet and the outlet of the second evaporator 7 detected by temperature sensors 411 and 412 respectively, and controls the opening degree of the second pressure reducing valve 400 based on the determined superheating degree.

When the cooling by the second evaporator 7, that is the cooling for the rear cabin, is stopped, refrigerant supply to the second evaporator 7 is stopped by fully closing the second pressure reducing valve 400.

Accordingly, the electromagnetic valve 5 is eliminated, and the $CO_2$ cycle is simplified. Thus, the manufacturing cost of the air conditioning apparatus may be reduced accordingly.

Figure 13:
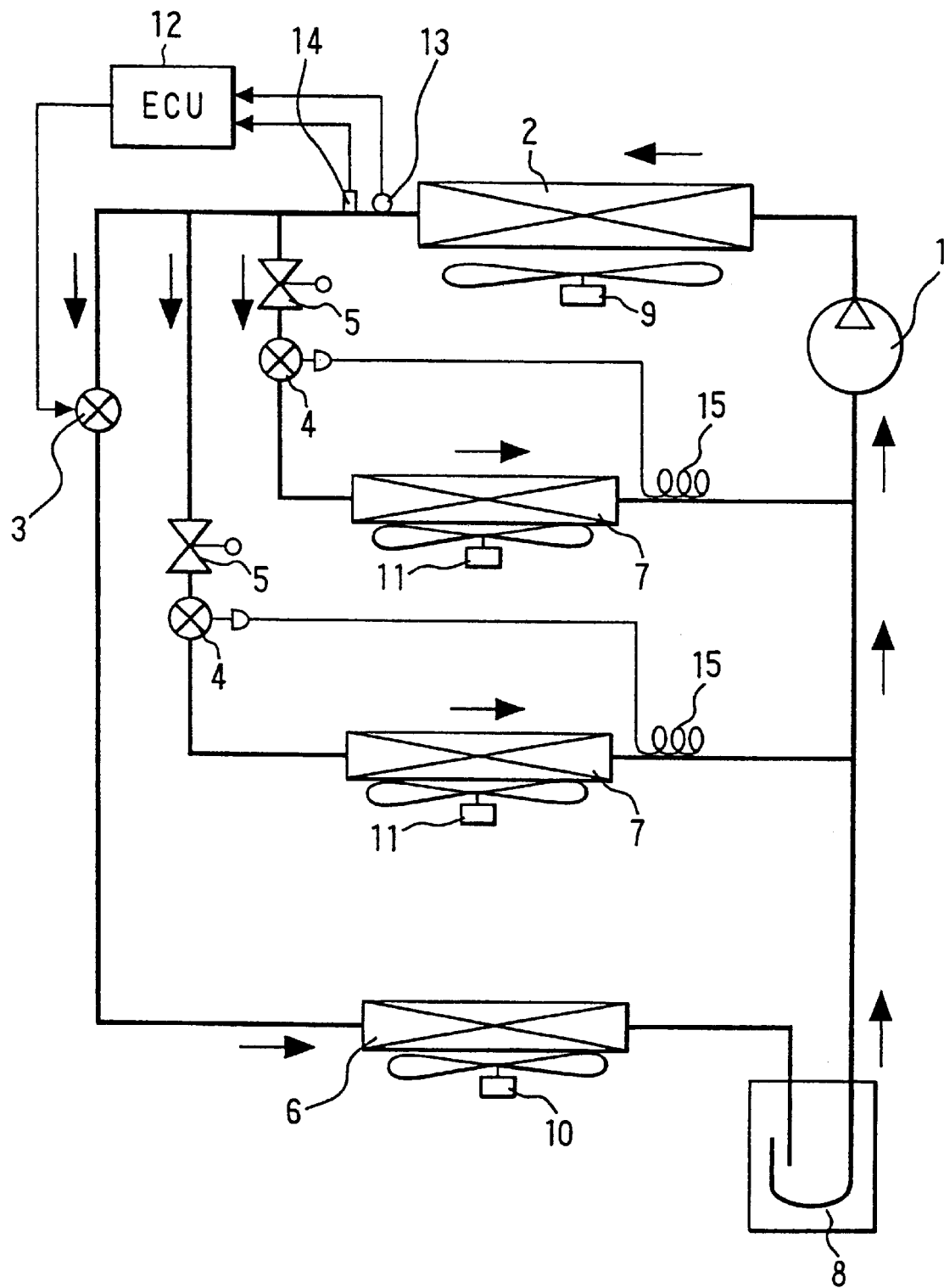
FIG. 13 is a schematic illustration showing a $CO_2$ cycle according to a modification of the present invention.

In this embodiment, only one second evaporator 7 for cooling the rear cabin is used. However, several second evaporators 7 may be used as shown in FIG. 13. In this modification shown in FIG. 13 has respective second pressure reducing valves 4 and electromagnetic valves 5 for each second evaporator 7.

Figure 14:
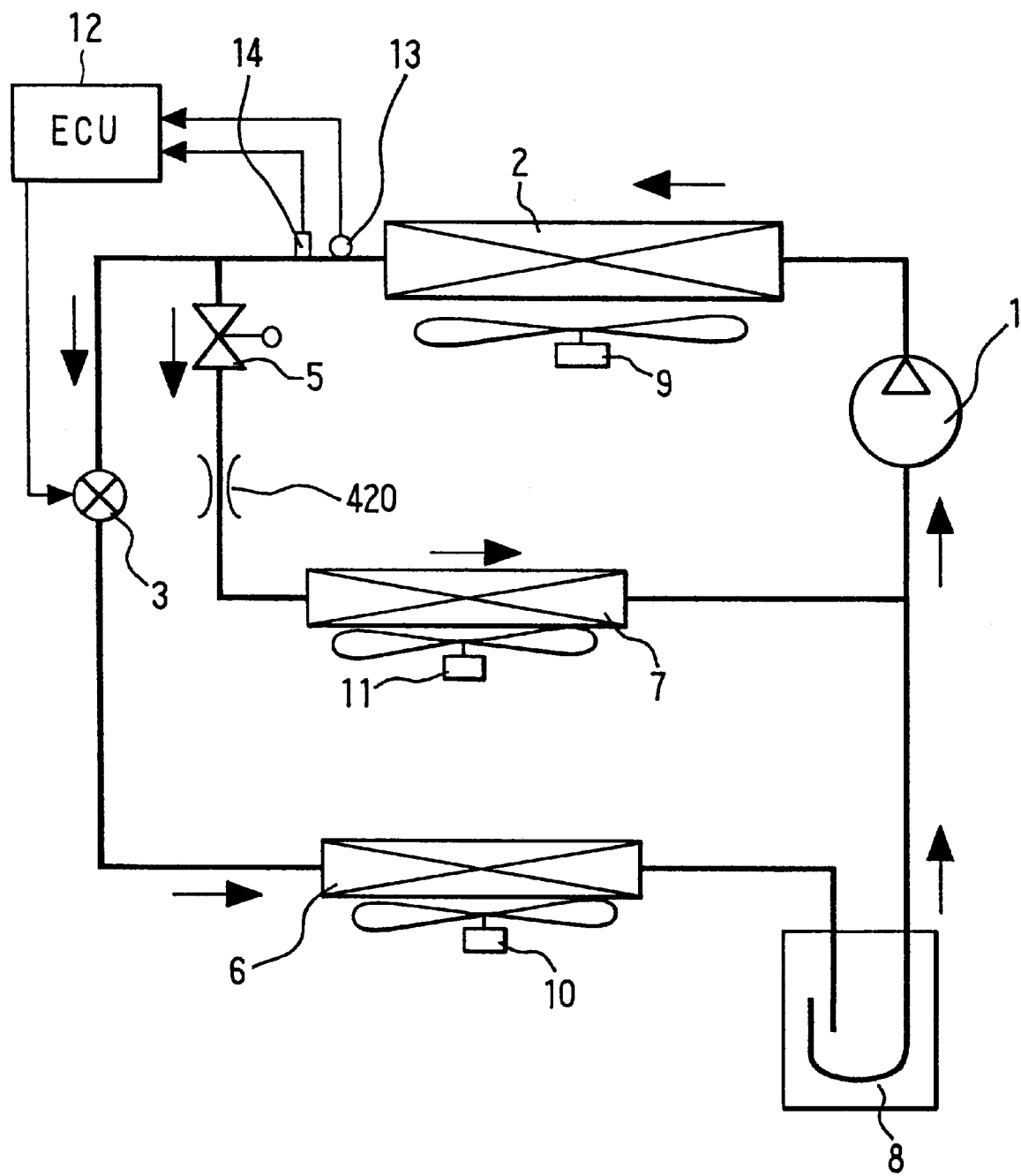
FIG. 14 is a schematic illustration showing a $CO_2$ cycle according to a modification of the present invention.

Although a thermal expansion valve is used for the second pressure reducing valve 4 in the first embodiment of the present invention, a second pressure reducing valve 420 having a fixed opening degree, such as a capillary tube or a fixed aperture, may be used instead as shown in FIG. 14. In this case, the opening degree of the second pressure reducing valve 420 should be appropriate such that the liquid phase refrigerant does not flow out from the second evaporator 7.

Furthermore, other refrigerant used under the supercritical conditions, such as ethylene, ethane or nitrogen oxide, may be used instead of $CO_2$ for all embodiments of the present invention.

According to the above described embodiments of the present invention, the first evaporator 6 cools the air to be blown to the front cabin, and the second evaporator 7 cools the air to be blown to the rear cabin. However, it is possible to change the structure such that the first evaporator 6 cools the air to be blown to the rear cabin, and the second evaporator 7 cools the air to be blown to the front cabin.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. A supercritical refrigerating circuit comprising:

a compressor for compressing refrigerant;

a gas cooler for cooling said refrigerant discharged from said compressor, said gas cooler having an inside pressure exceeding a critical pressure of said refrigerant;

a first and a second pressure reducing members connected in parallel to an outlet of said gas cooler for reducing refrigerant pressure of said refrigerant flowed out from said gas cooler;

a first evaporator for evaporating said refrigerant flowed out from said first pressure reducing member; and a second evaporator for evaporating said refrigerant flowed out from said second pressure reducing member, wherein;

refrigerant pressure at said outlet of said gas cooler is controlled by said first pressure reducing member such that said refrigerant pressure at said outlet becomes a certain pressure determined by refrigerant temperature at said outlet of said gas cooler.

2. A supercritical refrigerating circuit according to claim 1, wherein said second pressure reducing member is controlled such that a degree of superheating of said refrigerant at an outlet of said second pressure reducing member becomes a predetermined value.

3. A supercritical refrigerating circuit according to claim 1, wherein said circuit includes an accumulator provided at a downstream side of said first evaporator for separating gas phase refrigerant and liquid phase refrigerant to introduce said gas phase refrigerant to said compressor.

4. A supercritical refrigerating circuit according to claim 2, wherein said circuit includes an accumulator provided at a downstream side of said first evaporator for separating gas phase refrigerant and liquid phase refrigerant to introduce said gas phase refrigerant to said compressor.

5. An air conditioning apparatus for a vehicle comprising:

a compressor for compressing refrigerant;

a gas cooler for cooling said refrigerant discharged from said compressor, said gas cooler having an inside pressure exceeding a critical pressure of said refrigerant;

a first and a second pressure reducing members connected in parallel to an outlet of said gas cooler for reducing refrigerant pressure of said refrigerant flowed out from said gas cooler;

a first evaporator for evaporating said refrigerant flowed out from said first pressure reducing member;

a second evaporator for evaporating said refrigerant flowed out from said second pressure reducing member; and a valve for prohibiting said refrigerant flowed out from said gas cooler from flowing into said second pressure reducing member, wherein;

refrigerant pressure at said outlet of said gas cooler is controlled by said first pressure reducing member such that said refrigerant pressure at said outlet becomes a certain pressure determined by refrigerant temperature at said outlet of said gas cooler;

said first evaporator cools air to be blown to one of a front cabin and a rear cabin of the vehicle; and said second evaporator cools air to be blown to the other one of said front cabin and said rear cabin.

6. An air conditioning apparatus according to claim 5, wherein said second pressure reducing member is controlled such that a degree of superheating of said refrigerant at an outlet of said second pressure reducing member becomes a predetermined value.

7. An air conditioning apparatus according to claim 5, wherein said apparatus includes an accumulator provided at a downstream side of said first evaporator for separating gas phase refrigerant and liquid phase refrigerant to introduce said gas phase refrigerant to said compressor.

8. An air conditioning apparatus according to claim 6, wherein said circuit includes an accumulator provided at a downstream side of said first evaporator for separating gas phase refrigerant and liquid phase refrigerant to introduce said gas phase refrigerant to said compressor.

* * * * *